(12) United States Patent
Moore et al.

(10) Patent No.: US 9,962,866 B2
(45) Date of Patent: *May 8, 2018

(54) PROTECTIVE FILM

(71) Applicant: NeXolve Corporation, Huntsville, AL (US)

(72) Inventors: James D. Moore, Madison, AL (US); Brian G. Patrick, Madison, AL (US); Brandon S. Farmer, Knoxville, TN (US); Garrett D. Poe, Madison, AL (US); David L. Rodman, Meridianville, AL (US); Lonnie F. Bradburn, Athens, AL (US); Amy S. Davis, Huntsville, AL (US)

(73) Assignee: NeXolve Corporation, Huntsville, AL (US)

( * ) Notice: Subject to any disclaimer, the term of this patent is extended or adjusted under 35 U.S.C. 154(b) by 825 days.

This patent is subject to a terminal disclaimer.

(21) Appl. No.: 13/964,616

(22) Filed: Aug. 12, 2013

(65) Prior Publication Data

US 2013/0328235 A1   Dec. 12, 2013

Related U.S. Application Data

(63) Continuation of application No. 13/075,028, filed on Mar. 29, 2011, now Pat. No. 8,506,741.

(51) Int. Cl.
*B29C 41/32* (2006.01)
*B64B 1/14* (2006.01)
(Continued)

(52) U.S. Cl.
CPC ............... *B29C 41/32* (2013.01); *B32B 7/02* (2013.01); *B32B 27/12* (2013.01); *B32B 27/20* (2013.01);
(Continued)

(58) Field of Classification Search
CPC ......... B29C 41/32; B29C 41/00; B29C 41/30; B32B 2037/243; B32B 2038/168;
(Continued)

(56) References Cited

U.S. PATENT DOCUMENTS 5,428,102 A * 6/1995 St. Clair ............ C08G 73/1007
524/600
2002/0114967 A1   8/2002 Yamamoto
(Continued)

OTHER PUBLICATIONS

Dever et al., Space Environment Exposure of Polymer Films on the Materials International Space Station Experiment: Results from MISSE 1 and MISSE 2, High Performance Polymers, 20: 371-387, 2008, Sage Publications.

*Primary Examiner* — Jacob T Minskey
*Assistant Examiner* — Matthew Hoover
(74) *Attorney, Agent, or Firm* — Jeremy A. Smith; Bradley Arant Boult Cummings LLP

(57) ABSTRACT

A protective film has a soluble polyimide polymer base layer and an exterior layer directly contacting the base layer exterior surface. The base layer is less than 12 microns thick, and is at least 2 meters long. The exterior layer includes at least one of a fluorinated polymer, a dielectric layer, one or more metallic layers, a metalloid layer, or a plurality a dielectric layers where each dielectric layer has a dielectric layer thickness that varies no more than 3%. The exterior layer or the base layer can also include additives, as desired.

7 Claims, 1 Drawing Sheet

(51) Int. Cl.
  *B64B 1/58*  (2006.01)
  *B32B 7/02*  (2006.01)
  *B32B 27/12*  (2006.01)
  *B32B 27/20*  (2006.01)
  *B32B 27/28*  (2006.01)
  *B32B 37/24*  (2006.01)
  *B32B 38/16*  (2006.01)

(52) U.S. Cl.
  CPC ............. *B32B 27/281* (2013.01); *B64B 1/14* (2013.01); *B64B 1/58* (2013.01); *B32B 2037/243* (2013.01); *B32B 2038/168* (2013.01); *B32B 2255/10* (2013.01); *B32B 2255/205* (2013.01); *B32B 2260/021* (2013.01); *B32B 2260/046* (2013.01); *B32B 2262/0276* (2013.01); *B32B 2307/202* (2013.01); *B32B 2307/204* (2013.01); *B32B 2307/714* (2013.01); *B32B 2309/10* (2013.01); *B32B 2309/105* (2013.01); *B32B 2379/08* (2013.01); *B32B 2605/18* (2013.01); *Y10T 156/10* (2015.01); *Y10T 428/24942* (2015.01); *Y10T 428/266* (2015.01)

(58) Field of Classification Search
  CPC .......... B32B 2255/10; B32B 2255/205; B32B 2260/021; B32B 2260/046; B32B 2262/0276; B32B 2307/202; B32B 2307/204; B32B 2307/714; B32B 2309/10; B32B 2309/105; B32B 7/00; B32B 7/02; B32B 27/00; B32B 27/10; B32B 27/12; B32B 27/20; B32B 27/28; B32B 27/28; B32B 27/281; B64B 1/00; B64B 1/10; B64B 1/14; B64B 1/50; B64B 1/58
  USPC ......... 264/255; 156/249; 428/212, 337, 220, 428/385.5, 387
  See application file for complete search history.

(56) References Cited

U.S. PATENT DOCUMENTS

2007/0281570 A1  12/2007  Liggett
2009/0220740 A1  9/2009  Liggett
2010/0056666 A1  3/2010  Poe et al.

* cited by examiner

PROTECTIVE FILM

REFERENCE TO CROSS RELATED APPLICATIONS

This application is a continuation of, and claims the benefit of and priority to, U.S. Non-Provisional application Ser. No. 13/075,028 filed Mar. 29, 2011 entitled "Protective Film."

FIELD OF THE INVENTION

The current invention is in the field of polymeric films used to improve the properties of other materials.

DESCRIPTION OF THE RELATED ART

Protective films can be applied to other materials or articles for many reasons. Protection of an article is one reason to cover the article with a protective film. Different types of protection are possible, including protection from corrosion, protection from ultra-violet (UV) radiation, physical protection, gas permeation, and thermal control. Different materials and/or different additives can be used to provide the different types of protection, and it is possible to use multi-layer protective films to increase the amount of protection or the types of protection provided. Polymers are often used in protective films for their strength and flexibility. A wide variety of properties can be obtained by selecting the proper polymer, additives to the polymer, and additional layers or coatings of a polymer.

For example, certain articles can be protected from ultra-violet [UV] radiation damage with an exterior polymeric layer which reflects or absorbs the UV radiation. Most of the UV radiation is prevented from reaching the underlying article, so UV damage to the article is reduced. Protective films can also provide protection from ozone, atomic oxygen, or other corrosive environments. Additionally, it is possible for a polymeric layer to increase the rate of emission of electromagnetic, radiation without increasing the rate of absorption of electromagnetic radiation, so radiant heating can be controlled.

In many applications, the weight of an article should be minimized. For example, many aerospace applications require articles to be as lightweight as possible to facilitate flight. One example of an aerospace application which benefits from lightweight articles is an airship that remains aloft because it is lighter than air. One method to reduce the weight of an article is to minimize the thickness of a necessary protective film without significantly increasing the density of the film. Airships often have a significant surface area which requires a protective film, so reducing the thickness of the protective film can significantly reduce the weight of the entire airship.

Protective films can be independently produced, and then applied to an article. Techniques to produce thin protective films with the ability to adjust the protective properties are desirable, because the protective films can be used on many different applications. However, in many embodiments the protective film should be relatively long and/or wide, because application of multiple small protective films is labor intensive and uneconomical. Thin films can be difficult to manage, because thinner films tend to be weaker and more susceptible to damage than thicker films. It is easier to produce and manipulate very thin films in relatively small pieces, because manipulation of larger sheets can require larger forces to position and support the larger surface area. However, covering a large surface area with small sections of film is not practical. For example, it would be very labor intensive and difficult to cover the surface of a large airship with sections of film that measure 25 centimeters by 25 centimeters.

BRIEF SUMMARY OF THE INVENTION

A protective film has a soluble polyimide polymer base layer and an exterior layer directly contacting the base layer exterior surface. The base layer is less than 12 microns thick, and at least 2 meters long. The exterior layer includes at least one of a fluorinated polymer, a dielectric layer, one or more metallic layers, a metalloid layer, or a plurality of dielectric layers where each dielectric layer has a dielectric layer thickness that varies no more than 3%. The exterior layer or base layer can also include additives, as desired.

BRIEF DESCRIPTION OF TILE SEVERAL VIEWS OF THE DRAWINGS

DETAILED DESCRIPTION

Figure 1:
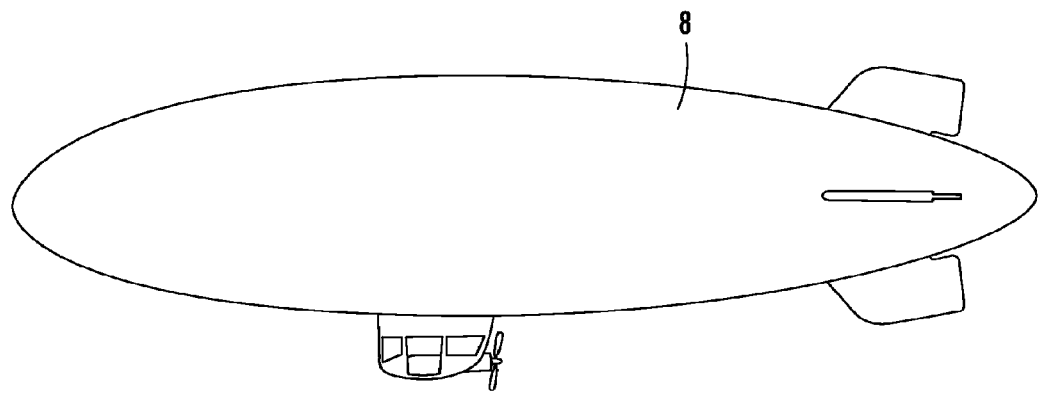
FIG. 1 is a side view of one embodiment of an airship.

The current invention can be used in aerospace applications, such as airships 8 or satellites, as seen in FIG. 1, and use in an airship 8 is described in detail to help clarify the benefits of the invention. It is to be understood that the invention can be used in many other applications, including non-aerospace applications, and the detailed description of the airship 8 application is not intended to limit the invention.

Airships

Airships 8 are frequently used for carrying some sort of payload at relatively low speeds. In this description, the term "airship" refers to a flying vessel which utilizes contained gases for lift, such as a blimp or a hot air balloon. The lift for an airship 8 is at least in part generated by containing a gas which is lighter than air. This can include the use of specific gases which are lighter than air, such as helium or hydrogen, or it can involve the use of heated gases such as in a hot air balloon. Because airships 8 maintain a contained gas, the material used to contain the gas should be relatively impermeable to gas. Gases will slowly pass through some materials, especially the small, light molecules which can be used for airships 8, such as hydrogen or helium. Therefore, the gas-containing material of an airship 8 should be relatively impermeable to gases, such as exhibiting less than 100 L/m$^2$/day gas permeability, to increase the life span of the airship 8.

Frequently, airships 8 will include some type of propulsion, such as a powered propeller, a thruster, or a jet engine. The airships 8 can be used for a wide variety of purposes. There are airships which are used for advertising and photography. Hot air balloons are frequently used for recreation, and some airships 8 can be used for communications. They can also be used for observations, for transport of various types of loads, and for other purposes.

Often times, it is desirable to have an airship 8 as physically small as possible to accomplish a specific purpose. One reason an airship 8 should be small is because it requires less material to produce the hull, which therefore reduces the cost of the hull. Also, a smaller airship 8 can be harder to detect, which can be particularly important for military uses, and may be less distracting to a viewer. Furthermore, a smaller airship 8 takes up less space than a larger one, and therefore reduces the chance of unintended impacts or accidents with other objects in the air.

Airships 8 can be operated at high altitudes, which provide several advantages. If the airships 8 are used for communication purposes or for observation purposes, a higher altitude provides a larger area within which the airship 8 has a direct line of sight connection. Therefore the higher the altitude, the larger the area that may be covered by the communication or observation system. Additionally, airship 8 operation at altitudes above the normal operating altitudes of airplanes and commercial jet traffic may minimize strikes with these maimed aircraft.

When an airship 8 is used at high altitudes there are some special considerations and factors which are different than when an airship 8 or other device is used closer to ground level. Higher altitudes provide less atmosphere, so a greater amount of ultra-violet [UV] light can reach the airship 8. Many materials are damaged by UV light, also referred to as UV radiation, but there are some materials which provide protection. Another consideration at increased altitudes is the presence of ozone [$O_3$]. Ozone is a highly reactive material and can attack and damage many materials, although it is possible to utilize some compounds which are resistant to ozone attack. Thermal control is also an issue at all altitudes, including high altitudes. Sunlight can heat an airship 8, which causes the gases inside to expand or to increase in pressure. Generally, at higher altitudes, more solar energy reaches the airship 8, resulting in a higher thermal loading.

Airships 8 should be designed so the strength of the hull material is sufficient to withstand the maximum pressure during operation. As the airship 8 heats up during a diurnal cycle, the gas will either expand, in the case of a fixed-pressure hull, or will increase in pressure, as in the case of a fixed-volume hull. It is also possible to have an airship 8 with an intermediate design, so increased temperature results in some internal gas expansion and some pressure increase. Accordingly, the hull strength requirement and subsequent design is partly determined by the pressure requirements. Typically, one result of increased strength requirements from the airship 8 hull material is a heavier hull material, where the weight is measured per unit area, such as grams per square meter or ounces per square yard. Therefore, reducing the amount of heat absorbed by an airship 8 results in a smaller temperature rise inside the airship 8, which can translate into a lower maximum pressure inside the airship 8, which reduces the strength requirement. This allows for use of a lighter hull material, which allows for the design of a smaller craft, which is desirable. There are many requirements and desirable properties for hull materials used in airships 8.

The hull material needs to retain sufficient end-of-life strength and level of gas impermeability. Frequently, an airship 8 will have a desired life span of at least a week, more preferably a month, even more preferably a year, and most preferably ten years or longer. The hull material should be resistant to UV damage, and an exterior protective film can be used to block UV radiation and protect the underlying layers. The hull material should also be resistant to ozone damage, and this resistance is frequently provided to the hull material by the exterior protective film. The hull material needs to maintain a level of lift gas impermeability to prevent the loss of the lifting gas, and a film can also provide or enhance this characteristic. Finally, it is often desirable to maximize the emissivity for a hull material and minimize the absorptivity, since these factors affect the airship 8 hull temperatures which reduce the airship 8 temperature. Preferably, the hull absorptivity to emissivity ratio should be less than 1, so the hull radiantly emits heat at a higher rate than it absorbs heat.

Laminate Strength

Figure 2:
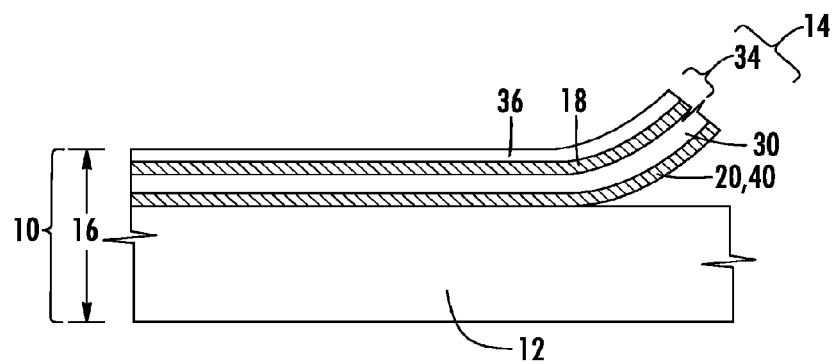
FIG. 2 is a side sectional view of one embodiment of the current invention, including a protective film and a substrate. The protective film is shown separating from the substrate to better clarify the components in the protective film.

Often the airship 8 will be constructed from a hull material 10, and the hull material 10 in this discussion has two primary parts: a substrate 12 and a protective film 14, as seen in FIG. 2, with continuing reference to FIG. 1. The substrate 12 can be one or more layers, and the protective film 14 is connected to the substrate 12. The substrate 12 can provide most of the hull material 10 strength, and the protective film 14 can be used primarily to increase the lifespan of the substrate 12 the operating environment. The substrate 12 can be comprised of one or a plurality of layers which are connected by one means or another, or it is also possible for the substrate 12 to be comprised of more than one layer wherein the layers are not connected and they merely contact each other. If the substrate 12 includes more than one layer, the different layers should each provide a benefit to the hull material 10, such as increased strength or gas impermeability. For example, the use of a substrate 12 comprised of aramid fibers in a polymeric matrix provides a high strength to weight ratio such that a relatively light substrate 12 can provide significant strength.

Laminate strength may be increased by increasing the thickness of the substrate 12. Strength is generally the hull material 10 property that requires the greatest hull material thickness 16, and increased thickness generally increases total hull material weight. It is desirable to provide additional hull material properties with the lowest possible weight. Therefore, it is desirable to have a protective film 14 that is very thin, and yet large enough to cover large areas of substrate 12 without having to seam together relatively small protective film pieces. Preferably the film should have a weight of less than 100 grams per square meter ($g/m^2$). More preferably the film should have a weight of less than 25 grams per square meter. Most preferably the film should have the weight of less than 15 grams per square meter. The lower the weight of the film the better, so even lower weights are more preferred as long as the desired performance properties are not compromised.

The hull material 10 needs to be strong enough to contain the gases at the increased pressures seen during the entire life span of the airship 8, regardless of the amount of handling damage, wear and tear, environmental exposure, or other damage which has occurred. The pressure within the airship 8 will frequently rise as the temperature of the airship 8 increases. This principle is approximated by the ideal gas law equation:

$$PV=nRT$$

where P=pressure, V=volume, n=the number of moles of contained gas, R=the universal gas constant, and T=temperature. Inside a fixed-volume airship 8 the volume (V), the number of moles (n), and the universal gas constant (R) are constant, so a temperature (T) rise increases the pressure (P), and vice versa. The ideal gas law provides good results if the temperatures and pressures used are not extreme, such as in most airships 8.

Gas impermeability can be provided by the substrate 12, the protective film 14, or a combination of the two. It is possible for the substrate 12 to include one or more gas barrier layers, as desired. The substrate 12 can also include other layers for different purposes, as desired. In this description, the exterior surface of the hull material 10 refers to the side exposed to environment, and the interior surface of the hull material 10 refers to the side containing the gas for the airship 8. The entire protective film, the substrate, and each layer within the protective film 14 and the substrate 12 also has an exterior and an interior surface corresponding to the exterior and interior surface of the hull material 10. The exterior surface is opposite the interior surface. The protective film 14 is on the exterior surface of the substrate 12 for protection from the environment. It is understood that the hull material 10 can be used for other purposes besides an airship 8, but the side with the protective film 14 is still referred to as the exterior surface.

The weight of the protective film 14 should be minimized so as to minimize the weight of the entire hull material 10, so long as the weight reduction is not so great as to compromise performance. Minimizing the overall weight of the hull material 10 helps to provide the smallest possible airship 8 necessary to carry the required load. The hull material 10 will basically define the surface area of the airship 8, and the gas contained within the hull material 10 will define the volume of the airship 8. Generally, as the dimensions of a fixed shape increase, the volume increases more rapidly than the surface area, and as the dimensions of a fixed shape decrease, the volume decreases more rapidly than the surface area. So, if the size of an airship 8 was reduced such that the surface area was cut in half, and the relative proportions of the air ship were not changed, the volume inside the airship 8 would be reduced by more than half. This results in a limit to how small an airship 8 can be for a hull material 10 with a fixed weight per area.

A fixed volume of lighter than air gas can keep a certain overall weight aloft, and a significant portion of the overall weight of the airship 8 can be the total weight of the hull material 10. Often, an airship 8 producer will provide a mass budget for the hull material 10, such as 250 grams per square meter. If a lighter hull material 10 with the same properties were available, a specified load could be carried by a smaller airship 8, or alternatively a heavier payload could be carried with the same size airship. Since the protective film 14 is part of the hull material 10, reductions in the weight of the protective film 14 produce a lighter overall hull material 10.

UV Protection

The protective film 14 should generally provide enough protection to allow the hull material 10 to remain functional and withstand the pressures, stresses and strains of the operational environment for the mission life of the airship 8. Generally this would be at least one week, more preferably one month, even more preferably a year, and most preferably ten years or longer. UV radiation passes into and through many materials, so in some embodiments the full depth of the protective film 14 can be used for UV protection. In other embodiments, UV radiation will not penetrate into the protective film 14, so only the exterior portion of the protective film 14 provides UV protection.

Many compounds suitable for the substrate 12 are susceptible to UV radiation attack as well as ozone degradation, and most fibers which are typically included in the substrate 12 are also susceptible to UV radiation and ozone degradation. Many materials which can be used in the substrate 12 require protection to withstand the high altitude environment, and materials which degrade in UV radiation may be desirable for costs or other factors. The protective film 14 can increase the number of materials and compounds which can be used in the substrate 12, because it allows the use of materials which degrade in UV radiation. The substrate materials can therefore be selected based on factors other than the ability to withstand the high altitude environment, such as cost, strength, weight, gas impermeability, and any other factors or properties that may be desired for a particular application.

Some polymers tend to be resistant to UV degradation, so a long service life is possible even in high UV environments. The use of aromatics in the polymer backbone also tends to help the polymer block UV radiation from passing through the polymer, so including aromatics in the polymer backbone may result in a material which can protect lower layers. Polyimides are one type of polymer with many aromatics in the backbone, and there are polyimides which are stable to UV radiation and serve to block the UV radiation from passing through to lower levels. The properties of a polyimide polymer depend on many factors, including the monomers used to produce the polyimide. Many monomers can be used to produce polyimides, and specific polyimide properties can be customized in the monomer selection process.

A polyimide can be designed to block essentially all UV radiation while allowing most visible light and infrared radiation to pass. With most polymers, the thickness of the polymer impacts the degree to which different frequencies of radiation penetrate or pass through the polymer. A polymer can be designed such that infrared and visible light pass through, but damaging radiation is blocked. However, the polymer design has to be balanced around the thickness at which the polymer will be used. If a polymer is designed to begin significant absorbing of radiation at about 400 nm at a thickness of 1 micron, this polymer could begin significant absorption of radiation at a different frequency if used at a thickness of 5 microns. Therefore, a polyimide can be designed such that the desired protection characteristics are achieved at a specified thickness of a polyimide, but these characteristics could be different if the polyimide were used at a different thickness. Other components of the protective film 14 could aid in blocking UV radiation to protect the substrate 12, so the polyimide may not have to block all the UV radiation.

There are many factors known to those of skill in the art which are utilized in designing polyimides or other polymers to obtain these characteristics. Preferably, the protective film 14 should block essentially all incident radiation with a wave length of 400 nanometers or shorter and the protective film 14 may allow incident radiation of a wave length longer than 400 nanometers to pass. UV radiation has a wavelength shorter than about 400 nanometers, and can still cause damage at lower quantities typically found in nature. By providing a protective film 14 that blocks incident radiation with a wavelength shorter than 400 nanometers, the protective film 14 is able to protect the hull material 10.

Because it is always desirable to reduce the overall weight of the hull material 10, any method which reduces the weight of the hull material 10 should be considered. One way to do this is to add a reflective pigment 18 to the protective film 14. One example of this is the use of titanium dioxide [$TiO_2$] as a reflective pigment 18, but other reflective pigments 18 can also be used. $TiO_2$ tends to release free-radicals when struck by UV radiation and these free-radicals can attack and damage many compounds. For this reason the $TiO_2$ can be encased in silicon dioxide [$SiO_2$], which tends to absorb the free-radicals and protect other molecules nearby. When $TiO_2$ is added to the polymer in the protective film 14 it tends to increase the protective film density, but it reduces the protective film thickness necessary to protect the substrate from UV radiation enough that the overall mass of the protective film 14 can be less when this reflective pigment 18 is used. It has been found that using $TiO_2$ encased in $SiO_2$ within a polyimide matrix can reduce the required thickness of the protective film 14 by a factor of 5, and the density increases by less than 15%, resulting in significant weight savings.

It is possible to use the reflective pigment such that incident UV radiation does not penetrate the protective film 14 more than 2 microns and, in fact, it is even possible to prevent incident UV radiation from penetrating the protective film 14 more than 1 micron. As a general rule of thumb, in order to better scatter incident UV radiation or incident radiation of any wavelength, the dimensions of a particle which is used for protection should be at least ½0th of the radiation wave length. Particles can be larger than this, but if the particles are smaller they tend to let the radiation pass by without being scattered.

When a reflective pigment 18 is utilized to provide protection from incident UV radiation, it can be enclosed in a matrix of polyimide polymer. However, because the reflective pigment 18 provides much of the protection from UV radiation, it is also possible to utilize silicon-based materials for the matrix in which the reflective pigment is held. Many silicon-based materials, (including silicon and silicones), are stable to ultra-violet radiation, but do not absorb ultra-violet radiation, so many silicon-based products do not directly provide UV protection for the lower layers. If silicon-based products are used, the reflective pigment provides protection from the ultra-violet radiation and the UV stable matrix of silicon-based product serves as a foundation for holding the reflective pigment.

Many metallic and/or metalloid layers 20 can also be used for UV radiation protection, because the UV radiation is reflected or absorbed by the metal and does not reach the underlying substrate 12. A wide variety of metals can be used in the metallic layer 20, and the metallic layer 20 can even be comprised of multiple layers of the same of varying metals. For example, a metallic layer 20 of silver can include an adhesion seed layer, then a silver layer, and finally an anti-corrosion layer on the surface. Silver, nickel, aluminum, gold, and chrome are examples of metals which can provide protection from UV radiation. Very thin metallic layers 20 provide good protection from UV radiation, as long as the layer is thick enough to evenly coat the substrate 12 without holes or gaps. Metalloid layers may also be reflective, and provide protection from UV radiation. As with metals, metalloids can be used alone or in combination with other metalloids and/or metals.

Figure 3:
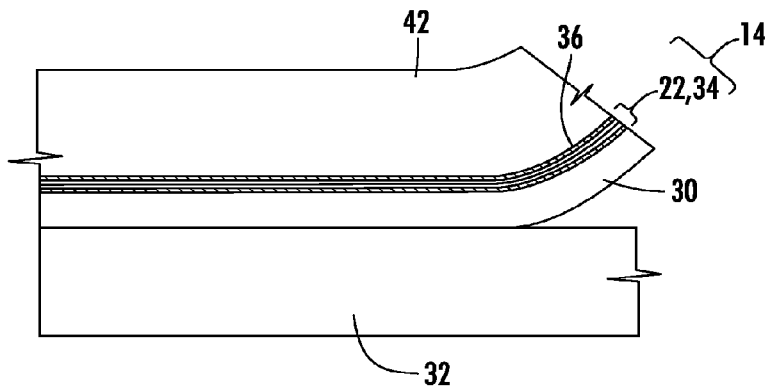
FIG. 3 is a side sectional view of an alternate embodiment of the current invention during manufacture, where the first carrier film is being removed from the protective film.

Multiple layer dielectrics 22 can be used to reflect selected frequencies of radiation, including UV radiation, as seen in FIG. 3, with continuing reference to FIGS. 1 and 2. The multiple layers of dielectrics are selected so adjacent layers have a different refractive index. There are many ways to select adjacent layers for reflectivity, including selecting the material and layer thickness for specified layers. The selection of adjacent layers for specified properties is complicated, but understood by those skilled in the art. The thickness of the dielectric layers should be consistent and accurate, because significant variation in thickness will result in the multiple layer dielectric 22 not reflecting the desired frequency. Ideally, the thickness of each layer should not vary by more than 10%, more preferably the thickness should vary less than 5%, and most preferably the thickness should vary less than 3%. It is possible to include adjacent layers of dielectric with similar refractive indexes, but better reflection with smaller thicknesses are possible with larger differences in refractive indexes of adjacent layers.

A reflector can be a multilayer dielectric 22 which is built to reflect desired frequencies by selecting dielectrics with the desired variation in refractive index for adjacent layers, and by the thickness of the layers. Typical dielectrics used include magnesium fluoride, silicon dioxide, tantalum pentoxide, zinc sulfide, and titanium dioxide. So, to increase the range of frequencies reflected, a variety of different thicknesses and/or refractive index variations can be included in the same multi layer dielectric 22. Multilayer dielectrics 22 can produce ultra-high reflectivity mirrors with reflectance values of 99.999% or better over a narrow range of wavelengths. Alternatively, they can be made to reflect a broad spectrum of light, such as the entire visible range. Multilayer dielectrics 22 can be used to provide UV radiation protection, because the multilayer dielectric 22 can be constructed to reflect or absorb damaging UV radiation before it reaches the substrate 12.

Ozone Protection

If the airship 8 is used in the atmosphere at high altitudes, it will be exposed to ozone. Ozone is an extremely reactive compound which attacks and damages many materials. Therefore the protective film 14 should be stable to ozone and protect the substrate 12 from ozone attack. Ozone corrosion occurs at the exterior surface of the protective film 14, because that is where the chemical ozone contacts the hull material. Subsurface layers of the protective film 14 are not exposed to ozone, so resistance to ozone attack is not critical for those sub-surface layers provided that the most exterior surface is adequately durable and non-porous.

Many dielectric compounds resist ozone attack, so a protective film 14 with a dielectric material for the exterior layer can protect sub-surface layers and the substrate 12 from ozone attack. A multilayer dielectric 22 can have a dielectric for the exterior layer, so including a multilayer dielectric 22 as the exterior layer of a protective film 14 can provide protection against ozone attack. Alternatively, a single dielectric layer that forms the exterior surface of the protective film 14 can also provide ozone protection.

Other materials can provide protection to ozone degradation when used as the exterior layer of the protective film 14. These layers will be exposed to UV radiation, so they should be able to withstand UV radiation, but it is not critical these materials block UV radiation if lower layers provide that function. Some fluorinated polymers can be used for ozone protection, including fluorinated ethylene propylene (FEP polymers), fluoroethylene alkyl vinyl ethers (FEVE polymers), ethylene chlorotrifluoro ethylene (eCTFE polymers), polyvinyl fluoride, and polyvinylidene fluoride (PVDF polymers), as well as others. The carbon-fluorine bond is very stable, so fluorinated polymers tend to be resistant to ozone attack. Many metallic and metalloid substances can also withstand ozone attack, so metallic or metalloid layers can be used on the exterior surface of the protective film 14 for ozone protection. Some metallic compounds which can provide protection from ozone attack include aluminum, nickel, and gold. Most polyimide polymers suffer unacceptable ozone corrosion.

Atomic Oxygen

A hull material 10 used in low earth orbit will be exposed to atomic oxygen (AO)). AO is very corrosive, and rapidly degrades many polymeric compounds. Similar to ozone, AO is a chemical compound, so AO corrosion occurs at the exterior surface of the hull material 10. A protective film 14 with an AO resistant exterior layer can protect the remainder of the protective film 14 as well as the substrate 12 and other subsurface layers or compounds. A protective film 14 can be used to protect a wide variety of structures in space craft, including booms, living quarters, blankets, etc., so the protective film 14 could be connected to a wide variety of surfaces besides airship 8 substrates 12 for protection.

Some compounds which can be used for AO protection include many dielectrics, such as silicon dioxide. Some metals are resistant to AO degradation, such as gold and aluminum, but other metals are corroded, such as silver. Most polymers are corroded by AO, but a polyimide polymer with incorporated oligomeric silsesquioxane is resistant to AO attack, as described in U.S. Pat. No. 7,619,042, which is fully incorporated herein by reference.

Emissivity and Absorptivity Ratio

Visible light is one form of electromagnetic radiation. Other types of electromagnetic radiation include infrared, ultraviolet, radio waves, microwaves, X-rays and gamma rays. The different types of electromagnetic radiation are differentiated by wavelength, where ultraviolet light has wavelengths between approximately 100 nanometers and 400 nanometers, visible light has wavelengths between approximately 400 nanometers and approximately 750 nanometers, and infrared radiation has wavelengths between approximately 750 nanometers and 300 micrometers.

Radiant heat is transferred from one object to another by the emission or absorption of electromagnetic radiation. A significant portion of radiant heat transfer of objects in high altitude environments involves infrared radiation (also referred to as infrared light), visible light, and ultraviolet light. A "radiant heat transfer environment" is defined as an environment where radiant heat transfer is the dominant form of heat transfer, so conduction and convection are less important to overall heat transfer than radiant heat transfer. High altitude environments separated from land can be radiant heat transfer environments, because there is no object present for conduction and the air can be thin enough that convective heat transfer is not very effective. High altitude environments include space, where there is no air and radiant heat transfer tends to be dominant. Although the other types of electromagnetic radiation also transfer heat, most radiant heat is transferred with ultraviolet, visible, and infrared light.

Often, a primary heating source is the sun, wherein the solar radiation comprises ultraviolet, visible, and infrared radiation. Other heat sources are the earth, the moon, and other structural objects within a local vicinity. The difference in the rate of absorption of electromagnetic radiation by an object as compared with the rate of emission of electromagnetic radiation by the same object in a radiant heat transfer environment, such as many high altitude environments, affects the temperature of the object. So, if an object absorbs electromagnetic radiation at a rate faster than it emits in a radiant heat transfer environment, the object tends to increase in temperature, and vice versa.

Incident electromagnetic radiation from various sources can interact with the object in one or more of three modes: it can be absorbed by the object; it can be reflected by the object, or it can be transmitted through the object. Different objects have different tendencies to absorb, reflect, or transmit electromagnetic radiation, and an object can have different tendencies to absorb, reflect, or transmit electromagnetic radiation of different frequencies. For example, certain polyimides as described above tend to transmit ultraviolet and visible light with a wavelength higher than the 50% transmittance, and the same polyimide tends to absorb electromagnetic radiation with a wavelength shorter than the 50% transmittance. If a polyimide has a 50% transmittance of about 399 nanometers or less, the polyimide will appear to exhibit low or no color to the human eye. However, if a polyimide has a 50% transmittance greater than about 399 nanometers, the polyimide may appear colored. Polyimides which appear colored tend to absorb more ultraviolet and visible radiant heat than clear polyimides.

The tendency of an object to absorb, reflect, or transmit electromagnetic radiation of a specific frequency can be measured. For a given object, the absorptivity is the ratio of incident electromagnetic radiation which is absorbed divided by the total incident electromagnetic radiation, where incident electromagnetic radiation is the total amount of electromagnetic radiation striking the object. The incident electromagnetic radiation can be measured for a set wavelength, or for a range of wavelengths. In the same manner, for a given object the reflectivity is the ratio of incident electromagnetic radiation reflected divided by the total incident electromagnetic radiation, and the transmissivity is the ratio of the incident electromagnetic radiation transmitted, or passing through the object, divided by the total incident electromagnetic radiation. The absorptivity, reflectivity, and transmissivity for a given object at a set wavelength or range of wavelengths add to one, because all incident electromagnetic radiation is either absorbed, reflected, or transmitted. Since a primary heating source is often the sun, the solar absorptivity, solar reflectivity, and solar transmissivity are important parameters that affect the temperature of objects, especially objects in high altitude environments.

Objects also emit electromagnetic radiation. The tendency of an object to emit electromagnetic radiation is referred to as the emissivity of the object, where "emissivity" is the ratio of electromagnetic radiation emitted by an object per unit area divided by the electromagnetic radiation emitted by a black body per the same unit area at the same temperature. A black body is a reference which emits a maximum amount of electromagnetic radiation at a given temperature.

Reflected and transmitted electromagnetic radiation do not significantly change the temperature of an object, but the rate at which electromagnetic radiation is absorbed as compared with the rate at which electromagnetic radiation is emitted affects the temperature of an object in a radiant heat transfer environment, such as many high altitude environments. The emissivity of an object in the wavelengths from approximately 1 micron to approximately 35 microns is often referred to as the thermal emissivity of an object. The thermal emissivity is therefore an important parameter that affects the temperature of objects. Some reflective pigments 18, such as $TiO_2$, tend to increase the emissivity of the polymer as well as reflecting radiation to control absorptivity.

An object will tend to approach an equilibrium temperature, so objects hotter than the equilibrium temperature tend to cool down and vice versa. The equilibrium temperature in a radiant heat transfer environment is the temperature at which the rate of energy absorption is equal to the amount of energy emission. In a radiant heat transfer environment, the rate of heat emission depends primarily on the temperature of the object and the emissivity of the object, and the rate of heat absorbed depends on the absorptivity of the object and the amount of incident electromagnetic radiation. Both a higher emissivity and a lower absorptivity tend to result in an object having a lower equilibrium temperature.

Several factors can influence the transmissivity, reflectivity, absorptivity, and emissivity of objects. Many of these factors depend on the surface of the object, but there are other factors as well. The absorptivity to emissivity ratio is somewhat dependant on temperature, but a ratio can be provided which is relatively constant for temperatures ranging from −110 degrees centigrade to +150 degrees centigrade. For example, clear glass has a high solar transmissivity, but a black coating may decrease the solar transmissivity of the object. In general, black objects tend to have higher solar absorptivities than white objects. An object with one surface which is black and the other surface which is white may have different solar absorptivities when measured at the different surfaces. The same is true for solar reflectivity, solar absorptivity, and thermal emissivity, so these properties can depend on the surface, and these properties can vary on different surfaces and different parts of an object. The protective film 14 should have a higher emissivity than absorptivity from the exterior surface, because significant changes in temperature may result from radiant heat transfer from the exterior of the airship 8.

Some properties depend on the thickness of a material. A thin layer of polymer or glass may exhibit a high solar transmissivity, but a thicker layer of the same material may begin to appear colored and exhibit a lower solar transmissivity. Similarly, thermal emissivity for uncoated polymeric layers tends to increase with increased thickness of the polymeric layer, so thicker layers of polymer films tend to emit more electromagnetic radiation than a thinner film layer of the same polymer material at the same temperature. In a radiant heat transfer environment in which the dominant heating source is the sun, the thermal emissivity, solar absorptivity, solar transmissivity, and solar reflectivity affect the temperature of the object.

Many metallic materials, including aluminum, silver, and gold, and many surfaces coated with metallic materials tend to exhibit lower solar absorptivity than nonmetal materials. However, many metals also exhibit lower thermal emissivities than nonmetal materials, which means that the rate of electromagnetic radiation energy emitted between approximately 1 micron and approximately 35 microns is lower than the rate of electromagnetic radiation energy emitted in the same bandwidth for nonmetal materials. For many metals, the solar absorptivity is higher than the thermal emissivity, so without additional temperature control, metals will tend to increase in temperature when exposed to sunlight in a radiant heat transfer environment, including many high altitude environments. Many polymers tend to have a high thermal emissivity, and clear polymers can have a low solar absorptivity and high solar transmissivity. Transmissivity of a polymer or other materials is frequency dependent, so visible light may readily pass through the polymer but UV light may not. For many clear polymer materials in a radiant heat transfer environment, its thermal emissivity is higher than its solar absorptivity. Therefore, the temperature increase that occurs upon exposure to sunlight is lower than that of many uncoated metals in the same environment.

To control temperature, the emissivity should be greater than the absorptivity. In other words, the absorptivity to emissivity ratio should be less than 1. It is desirable to minimize this ratio as much as possible. Several different techniques can be used to lower the absorptivity to emissivity ratio to less than 1.

Absorptivity can be reduced by reflecting incoming radiation, or by transmitting incoming radiation (allowing the radiation to pass through without being absorbed.) A protective film 14 can transmit radiation, but the underlying substrate 12 may absorb the radiation and thereby increase temperature. Therefore, it is preferable for the protective film 14 to reflect radiation to lower the absorptivity. Radiation can be reflected using reflective pigments, metallic layers, metalloid layers, or multilayer dielectrics 22, amongst other techniques. A clear layer (which transmits infrared and visible radiation) above a reflecting layer does not significantly increase absorptivity, because the radiation passes through the clear layer, reflects off of the reflective layer, and then passes back through the clear layer and out of the hull material 10. Colored polymers tend to have higher absorptivities than clear polymers, so clear polymers are generally preferred.

Electrostatic Discharge Protection

Electrostatic charge can build up on nonconductive aircraft, including airships 8, and the resulting electrostatic discharge can cause damage. Static electricity is often generated and concentrates on the surface of objects, and damaging electrostatic discharges can be controlled by increasing the surface conductivity of the object so that the surface potential of the object is lowered relative to the ground potential of the object. The increased surface conductivity facilitates the conduction of charges, so the charge potential does not get high enough for static discharge. Most pure polymers are poor conductors, so static discharge can be controlled by increasing the conductivity of the protective film 14. Electrically conductive additives can be incorporated into the protective film 14 to limit the surface electrical resistivity to no more than $10^{11}$ ohms per square, or to limit the bulk electrical resistivity to no more than $10^{11}$ ohm-cm. Electrically conductive additives can decrease the electrical resistivity enough to prevent electrostatic discharge damage. There are other methods of modifying the electrical resistivity to provide electrostatic discharge protection to polymers, such as vapor deposition of an indium-tin oxide (ITO) layer.

Polymer Customization

Polyimides are a type of polymer with many desirable characteristics, such as resistance to UV degradation and thermal stability. Most polyimides are considered an AA-BB type polymer because two different classes of monomers are used to produce the polyimide polymer. One class of monomer is called an acid monomer, and is usually in the form of a dianhydride. The other type of monomer is usually a diamine, or a diamino monomer. In this description, a polyimide polymer is further described by naming the monomers used to produce that polyimide polymer. For example, reference to a 6FDA-BDAF polyimide means a polyimide formed from the monomers 6FDA (4,4'-(hexafluoroisopropylidene) diphthalic anhydride) and BDAF (2,2'-bis-(4-aminophenyl)-hexafluoropropane). If more than 2 monomers are used to produce the polyimide, each monomer used will be listed. A ratio may be provided for two or more of one type of monomer, so two acid monomers listed with a "50/50" indicates the two acid monomers are present at a 50 mole percent ratio. The term "AO resistant polyimide" is defined as polyimides produced by the process described in U.S. Pat. No. 7,619,042, which was previously incorporated herein by reference. In general, an AO resistant polyimide is a polyimide which incorporates an oligomeric silsesquioxane, preferably when the oligomeric silsesquioxane connected to the polymer backbone through a tether. The diamine and the acid mono generally added in approximately a 1:1 molar stoichiometry.

Because one dianhydride monomer has two anhydride groups, different diamino monomers can react with each anhydride group so the dianhydride monomer is located between two different diamino monomers. The diamine monomer contains two amine functional groups; therefore, after one amine attaches to the first dianhydride monomer, the second amine is still available to attach to another dianhydride monomer, which then attaches to another diamine monomer, and so on. In this matter, the polymer backbone is formed.

The polyimide polymer is usually formed from two different types of monomers, and it is possible to mix different varieties of each type of monomer. Therefore, one, two, or more dianhydride-type monomers can be included in the reaction vessel, as well as one, two or more diamino monomers. The total molar quantity of dianhydride-type monomers is usually kept about the same as the total molar quantity of diamino monomers. Because more than one type of diamine or dianhydride can be used, the exact form of each polymer chain can be varied to customize certain polyimides properties. For example, polyimides can be customized to adsorb electromagnetic radiation, or light, of certain frequencies, but not to adsorb light of other frequencies.

Polyimide polymers usually absorb the shorter wavelengths of light up to a specific wavelength, which can be referred to as the 50% transmittance wavelength (50% T). Light with wavelengths longer than the 50% transmittance wavelength are generally not absorbed and pass through the polymer or are reflected by the polymer. The 50% T is the wavelength at which 50% of the electromagnetic radiation is transmitted by the polymer. The polymer will tend to transmit almost all the electromagnetic radiation with a wavelength longer than the 50% T, and the polymer will absorb almost all the electromagnetic radiation with a wavelength shorter than the 50% T, with a rapid transition between transmittance and adsorption at about the 50% T wavelength. If the 50% T can be shifted to a frequency shorter than the visible spectrum, the polymer will tend to be very clear, but if the 50% T is in or above the visible spectrum, the polymer will be colored. Therefore, if the 50% T is at the interface between the visible and UV wavelengths, the polymer would appear colorless.

Certain monomer characteristics tend to push the 50% T value lower, which allows adjustment in the 50% T in the polyimide produced. By doing this, an artisan can customize a polyimide to transmit electromagnetic radiation with a frequency longer than a predetermined value, such as 400 nanometers, and to adsorb electromagnetic radiation with a frequency shorter than the predetermined value. Some of the monomer characteristics which push the 50% T lower include flexible spacers, so-called kinked linkages, and bulky substituents. The flexible spacer is an atom covalently bonded between two separate phenyl groups. Alkyl linkages are not as stable as the phenyl groups, so the use of simple hydrocarbon alkyl groups between phenyl groups can reduce the stability of the polymer. The stability of the overall polymer can be improved if the linkage is saturated with fluorine instead of hydrogen. Also, the use of other atoms in the flexible spacer, such as oxygen or silicon, can result in a more stable polymer.

The term kinked linkages refers to a meta connection on a phenyl group in the polymer backbone, as well as an ortho connection. Ortho connections are seldom used, but meta connections are well known. A meta connection means the polymer backbone would be connected through a number 1 and number 3 carbon on a phenyl group. The use of kinked linkages, in the polymer backbone also tends to result in a higher coefficient of thermal expansion.

Bulky substituents in the polymer also tend to lower the 50% T value. Bulky substituents are compounds which are large and tend to interfere with intramolecular and intermolecular chain association because of their size. The bulky substituents can be included between phenyl groups in the backbone, connected directly to a phenyl group, or they can be tethered to the polymer backbone. The bulky substituents tend to reduce the ability of adjacent polymer chains to tightly associate.

Protective Film Production

The protective film 14 can be produced separately from the substrate 12, and then later connected. Separate production of the protective film 14 allows one film to be used to protect a wide variety of substrates 12. The protective film 14 can be connected to the substrate 12 with an adhesive, thermal bonding, diffusion welding, ultrasonic welding, or other techniques known to those skilled in the art.

Base Layer

The protective film 14 includes a base layer 30, which serves as a seed layer, and additional protective layers are added to the base layer 30. The base layer 30 comprises a soluble polyimide polymer, and may include more than one polyimide polymer either mixed together or applied as successive layers. In one embodiment, a soluble polyimide comprises at least 40% by weight of the base layer 30. In another embodiment, a soluble polyimide comprises at least 70% by weight of the base layer 30. The base layer 30 also may include other polymers mixed with a polyimide polymer, such as polyamide polymers, polyamide imide polymers, polycarbonate polymers, polyarylether polymers, or a wide variety of other polymers.

The base layer 30 should be very thin, because the protective film 14 should be as light as possible. A film needs to have a certain thickness in order to be practical for handling and managing. If a film is too thin, it will tear, rip, or be otherwise damaged whenever it is moved or positioned. Solvent cast films are typically made by casting a dope, or a polymer dissolved in a solvent, on a substrate, such as a belt. The solvent is evaporated, and the resulting film can be removed from the substrate for use. The substrate is often a drum or a belt rotating between two or more rollers. The production rate, or the throughput rate, can depend on the amount of time needed to evaporate the solvent from the dope. Some high throughput equipment will use rollers to carry the dope and substrate through an oven or other drying device. The path length through the drying device and the number of passes may be increased so that the residence time in the drying device increases, which provide for higher throughput rates.

These high throughput machines tend to use tension to draw the solvent cast film and substrate through the drying device, so a certain strength is needed to withstand that tension. Similar techniques can be used for coating a film, except the polymer base layer often serves as the substrate and is used to provide the strength to withstand production tensions. Many polyimide films with a thickness of 12 microns or less do not have the strength to withstand the tensions of most commercially available high throughput casting or coating machines. Films of 10 or 8 microns are even less likely to have the strength to withstand high throughput casting or coating machine tensions. Therefore, production of thin polyimide films can require different types of industrial processing equipment which tends to reduce production rates, increase total costs, and limit manufacturing options.

The base layer 30 should be long, so the protective film 14 can be applied to the substrate 12 in an economical manner. Preferably, the base layer 30 should be provided in bulk rolls and have a length of at least 2 meters, more preferably at least 10 meters, and most preferably at least 50 meters. Longer films require industrial film handling processes, as opposed to laboratory film handling processes, and the desired longer lengths suggest industrial film handling processes should be used. The longer lengths also suggest high throughput casting and/or coating machines that utilize film tension for processing, because the rate of production can be more important for longer films. Industrial film handling processes can be more stressful on a film than laboratory processes. The base layer 30 should also have a thickness of less than 12 microns, or more preferably no more than 10 microns, and most preferably no more than 8 microns.

Polyimide polymer films which are less than 12 microns thick are difficult to handle industrially, and many high throughput industrial casting and/or coating processes applicable to long films can damage these thin polyimide films. Polyimide films which are less than 10 microns are more difficult to handle, and polyimide films less than 8 microns are even more difficult to handle. In this description, a "long film" is defined to be a film of at least 2 meters or more in length, or more preferably at least 10 meters in length, or most preferably at least 50 meters in length. In some industrial coaling processes, the base film is held taught while the coating is applied, and polyimide films of less than 12 microns do not have the strength to withstand the coating processes. Polyimide films of less than 10 or 8 microns have even less strength, and are thus even more difficult to process. Some coating processes are gentler than others, and there are coating processes which can be used on polyimide films of less than 12 microns. However, the thickness (and the associated strength) of a film can limit industrial process options, as well as reduce the throughput rate and increase the cost of the casting and coating processes.

To overcome the film strength issues during production and coating, the base layer 30 can be applied as a coating to a first carrier film 32. Therefore, the first carrier film 32 should have a length comparable to the base layer length, or at least 2 meters, more preferably at least 10 meters, and most preferably at least 50 meters. The polyimide polymer used in the base layer 30 is a soluble polyimide, and this allows for efficient production of thin, long polyimide base layers 30. The first carrier film 32 can be rolled with the base layer 30, and can remain attached to the base layer 30 throughout the manufacturing process. It is also possible to remove the first carrier film 32 from the base layer 30 during the manufacturing process, as described below. The first carrier film 32 is different than a belt or drum in that the first carrier film 32 can remain attached to the base layer 30 outside of the base layer production process. In this description, the term "carrier film" refers to a disposable film used for a casting or coating process, and then later separated from the desired film, so the carrier film is not a component of the final finished product, such as an airship 8.

Most polyimide polymers are insoluble, and are only available in solid form or as a polyimide precursor, such as a polyamic acid. Typically, a polyimide precursor is formed in solution, and the polyimide precursor is stored in liquid form until the polyimide is formed. The polyimide precursor is formed to a desired shape, such as a film, and then the polyimide precursor is imidized to produce the polyimide polymer. In one embodiment, heat is applied to imidize a polyimide precursor to a polyimide, and the imidization reaction typically starts around 130 degrees centigrade (° C.), and finishes at a temperature in excess of 220° C., and often at temperatures of 300° C. or more. Polyimides can also be chemically imidized. Although most polymers cannot withstand the temperatures required to thermally imidize a polyimide precursor into a polyimide, many polyimide polymers can. Therefore, a polyimide carrier film would be one option for a carrier film if the polyimide precursor were to be thermally imidized on the carrier film. However, a polyimide precursor which is thermally imidized on a polyimide polymer carrier film may stick to the polyimide polymer carrier film, so the polyimide polymer carrier film cannot be separated from the base film 30 without unwanted damage to the base film 30.

A soluble polyimide is a polyimide that has been imidized, and the polyimide is soluble in a solvent, such as a polar aprotic organic solvent. Examples of suitable polar aprotic organic solvents include n-methyl-2-pyrrolidone, dimethyl formamide, and dimethyl sulfoxide. For purposes of this description, a "soluble polyimide" is defined to mean a polyimide that forms at least a one percent by weight solution in n-methyl-2-pyrrolidone at 25 degrees centigrade and atmospheric pressure. The polyimide polymer can then be cast on a suitable carrier film which will separate from the base layer 30 without significantly damaging the base layer 30. The polyimide and solvent liquid can be cured to produce a solid base film 30 by evaporating the solvent after the solvent and soluble polyimide are cast on the carrier film. In this description, "curing" a polyimide means evaporating the solvent from a soluble polyimide such that a solid polyimide remains.

The temperatures required to evaporate solvent from a soluble polyimide are typically much lower than those required to imidize a polyimide precursor, and many polymers can withstand the required evaporation temperatures. For example, suitable polymers include many polyimides, polyethylene naphthalate (PEN), polyethylene terephthalate (PET), polybutylene terephthalate (PBT), other polyesters, polyethylene, polypropylene, polycarbonates, polyamides, polyamide-imides, polyetheretherketones, polysulfones, polyphenylsulfones, polyethersulfones, polyphthalamides, polyphenylene, polyvinyl chloride (PVC), polyvinyl fluoride (PVF), polyvinylidine chloride (PVDC), polyvinylidine fluoride (PVDF), polystyrenes, polyurethanes, polyureas, acrylics, liquid crystal polymers (LCP), and silicones. Suitable evaporation temperatures depend on the nature of the processing equipment, polymer, and solvent, but generally are in the range of about 50° C. to about 300° C. Curing a solid polyimide often results in far less shrinkage than imidizing a polyimide, so curling and other challenges associated with shrinkage can be reduced by using a soluble polyimide for the base instead of a polyimide that requires imidization.

Because the base layer 30 is comprised of a soluble polyimide polymer which is imidized before application to the first carrier film 32, the first carrier film 32 can be a polymer which can be separated from the base layer 30 without significant damage to the base layer 30. The base layer 30 can be very thin and very long, because the strength of the first carrier film 32 supports the base layer for industrial coating and processing steps, and other handling operations. The first carrier film 32 can be thick enough to provide the needed strength for the processing steps because the first carrier film 32 is not a component of the final protective film 14, so thickness and weight are not restricted by the design parameters of the protective film 14, the hull material 10, or any other design specification.

The base layer 30 can include a reflective pigment 18, if desired. As discussed above, a reflective pigment can help lower the protective film absorptivity and transmissivity, and it can help increase the protective film emissivity. It is also possible to include other additives or compounds in the base layer 30, such as surfactants, dyes, softening agents, electrically conductive additives, or any of a wide variety of compounds. The various additives can modify different properties of the polyimide polymer, as is known to those skilled in the art. Therefore, the base layer 30 can help the protective film 14 provide protection from UV radiation, provide some electrostatic discharge protection, improve thermal control by reducing the absorptivity to emissivity ratio, and can serve as a bond layer or base for additional layers.

The base layer 30 can be applied to the first carrier film 32 by many techniques known to those skilled in the art, including gravure coating, three roll coating, knife over roll coating, metering rod (also referred to as a Meyer rod), dip coating, and air knife coating. These coating techniques can also be used for subsequent layers added as the final protective film 14 is built up from the base layer 30.

Exterior Layer

The base layer 30 has an exterior surface and an interior surface, as previously described, and the first carrier film 32 is connected to either the base layer interior surface or the base layer exterior surface. The first carrier film 32 is the carrier film that is initially connected to the protective film 14. In many embodiments, the base layer 30 will be cast and formed on the first carrier film 32, so the base layer 30 can become connected to the first carrier film 32 as the base layer 30 is formed. In this embodiment, the first carrier film 32 is connected to the base layer 30 on surface opposite where the initial coating layer will be applied, so the first carrier film 32 will not interfere with the coating process and yet will support the base layer 30. The second carrier film 42 is a carrier film that is connected to any layer of the protective film 14 after the first carrier film 32. In one embodiment, the first carrier film 32 is connected to the base layer interior surface. Therefore, in this embodiment the base layer exterior surface is exposed and available for coating with additional layers.

Any and all layers added to the exterior surface side of the base layer 30 are referred to in this description as the "exterior layer" 34. The exterior layer 34 can be a single layer or a plurality of layers, as desired. The carrier films 32, 42 described also have an exterior interior surface, similar to the base layer 30. Generically, each of the carrier films 32, 42 have two surfaces. The carrier film exterior surface is the surface facing the same direction as the base layer exterior surface, so the exterior surface of the first carrier film 32 faces the interior surface of the base layer 30 when the first carrier film 32 is connected to the interior surface of the base layer 30.

The base layer 30 is comprised of a soluble polyimide polymer, and many polyimide polymers are susceptible to attack from ozone. Therefore, an exterior layer 34 is preferred to protect the base layer 30 from ozone. The exterior layer 34 includes an outermost exterior layer 36, where the "outermost exterior layer" 36 is the exterior surface layer of the protective film 14, or the layer of the exterior layer 34 that is furthest from the base layer 30. Preferably, the outermost exterior layer 36 should be resistant to corrosion from the selected environment. For example, if the environment is high altitudes in the earth's atmosphere, the outermost exterior layer 36 should be resistant to ozone attack, and if the environment is low earth orbit, the outermost exterior layer 36 should be resistant to atomic oxygen attack. In some embodiments, the outermost exterior layer 36 can be a dielectric material. Materials which are resistant to ozone and/or atomic oxygen attack are discussed above.

The exterior layer 34 can comprise one or more layers selected from a fluorinated polymer, a dielectric layer, one or more metallic layers, one or more metalloid layers, and a plurality of dielectric layers where each dielectric layer has a dielectric layer thickness that varies no more than a specified amount. When the exterior layer 34 includes a plurality of dielectric layers where each dielectric layer has a dielectric layer thickness that varies no more than a specified amount, the dielectric layer thickness variation is preferably less than 10%, more preferably less than 5%, and most preferably less than 3%. The exterior layer 34 can also include additives, such as reflective pigments 18, surfactants, softeners, dyes, electrically conductive additives, and other materials which modify one or more properties of an exterior layer. The exterior layer 34 can provide the protective film 14 with ozone protection, atomic oxygen protection, UV radiation protection, electrostatic discharge protection, and/or thermal control by lowering the absorptivity to emissivity ratio, as well as other properties.

Interior Layer

In some embodiments, the protective film 14 can include an interior layer 40. The "interior layer" 40 includes any and all layers added to the interior surface side of the base layer 30. In some embodiments, the protective film 14 does not include an interior layer 40, so the base layer 30 of the reflective film 14 can be directly connected to the substrate 12. In other embodiments, the protective film 14 does include an interior layer 40, so the interior layer 40 can be connected to the substrate 12. The interior layer 40 can include one layer or a plurality of layers, as desired.

In one embodiment, the base layer 30 is applied to a first carrier film 32 such that the base layer interior surface is initially covered by the first carrier film 32. The exterior layer 34 is then added to the base layer exterior surface. A second carrier film 42 can then be added to the outermost exterior layer 36, and then the first carrier film 32 can be removed from the base layer 30. After the first carrier film 32 is removed from the base layer 30, the base layer interior surface is exposed and available for addition of the interior layer 40. An interior layer 40 can then be added, if desirable for the final application of the protective film 14. In some embodiments, the addition of the exterior layer 34 to the base layer 30 does not increase the strength of the combined layers to a point that allows certain industrial coating processes. Therefore, the second carrier film 42 is added prior to removal of the first carrier film 32 to give the protective film 14 enough strength for further processing. The first carrier film can 32 be removed by an inline delamination process. The protective film 14 can then be rolled or prepared by other methods for shipment or transport. Either the first or second carrier film 32, 42 can be left on the protective film 14 until application to the substrate 12 to facilitate handling. It is also possible to leave both the first carrier film 32 and the second carrier film 42 attached until the protective film 14 is used.

The interior layer 40 serves as a final protective layer in the protective film 14. The interior layer 40 can be one or more metallic layers 20, and/or one or more metalloid layers, as discussed above. The interior layer 40 can therefore serve to reflect radiation, and thereby lower the absorptivity and transmissivity of the protective film 14 to increase thermal control. Reducing transmissivity can help the hull material 10 protect components on the interior of the airship 8 from thermal gain or degradation. Metal and metalloid layers tend to have a relatively low emissivity, so thermal control is enhanced by positioning polymeric layers and/or dielectric layers above the metal or metalloid layers because the polymeric and dielectric layers tend to have a relatively high emissivity. The underlying metal or metalloid layer reflects radiation to decrease absorptivity and transmissivity, and the covering polymeric and dielectric layers increase emissivity. The absorptivity to emissivity ratio can be directional, so one side of the protective film 14 can have an absorptivity to emissivity ratio of less than 1, and the other side can have an absorptivity to emissivity ratio of greater than 1. In many instances, it is beneficial for the protective film 14 to have an absorptivity to emissivity ratio of less than 1 from the exterior surface.

The interior layer 40 can also provide additional benefits. Metal and metalloid layers are also effective at blocking UV radiation, and at providing protection from ozone or atomic oxygen, so the interior layer 40 can provide a final protective layer for several damaging environmental exposures. Metallic and metalloid layers are also generally more impermeable to gases, so the interior layer 40 can add gas impermeability to the list of benefits from the protective film 14.

Protective Film

The final protective film 14 comprises a base layer 30 and an exterior layer 34, and may comprise an interior layer 40. The total protective film thickness is preferably less than 14 microns, more preferably less than 8 microns, and most preferably less than 5 microns. The protective film 14 is a distinct, separate component from the substrate 12, so the protective film thickness does not depend on the substrate 12. The protective film 14 can have an emissivity greater than absorptivity from the protective film exterior surface, can block at least 99% of incident UV radiation, can have a bulk electrical resistivity of no more than $10^{11}$ ohm-cm, can have a surface electrical resistivity of no more than $10^{11}$ ohms per square, and can be connected to a substrate 12 and used as at least a component of an airship 8. The protective film 14 can also be applied to many other substrates 12 in different environments, including low earth orbit or selected industrial applications.

Adhesives can be used to connect the various layers within the protective film 14, but it is preferably to connect the layers without any adhesives. Adhesives can increase the total weight of the protective film 14, so it is preferred to use materials that will stick together without adhesives. Any layer which directly contacts another layer does not have an adhesive in between, because then the layers would not directly contact each other. Adhesives can have a different coefficient of thermal expansion than adjacent layers, and this can lead to additional stress during thermal cycles.

The protective film 14 can be made of materials that are transparent to radio waves, which can increase communication capabilities for devices positioned behind the protective film 14. For example, a radio positioned within an airship 8 could communicate if the airship 8 hull material 10 were transparent to radio waves. A metallic or metalloid layer can be made transparent to radio waves with appropriately spaced slits, and the metallic or metalloid layer or layers still provides other protective features.

EXAMPLES

Example 1—Protective Film of Soluble PI, Metal, Single Layer DE Bonded to VECTRAN® Fabric A protective film 14 is comprised of a base layer 30, a metallic coating, and a dielectric coating. The base layer 30 consists of a 30 meter long polyimide film with a thickness of five microns fabricated from a soluble polyimide polymer 6FDA-BDAF. This protective film 14 is affixed to a VECTRAN® fabric substrate 12, into which a binding polymeric adhesive has been imbibed to function as a binder matrix, by co-curing the protective film 14 onto the surface of the substrate 12 with the metallic side contacting the substrate 12. The metallic coating comprises the interior layer 40, and the dielectric coating comprises the exterior layer 34. The metallic coating 20 is 1,500 angstroms of silver directly bonded to the polyimide base layer 30, with a 200 angstrom anticorrosion layer on the metallic coating 20 opposite the base layer 30. The exterior layer 34 is 1,000 angstroms of $SiO_2$ (silicon dioxide) directly bonded to the polyimide base layer on the side opposite the metallic layer 20. The protective film 14 is directly bonded to a fibrous substrate 12, such that the anticorrosion layer directly contacts the substrate 12. The base layer 30 was cast on a 3 mil thick first carrier film 32 made of polypropylene, then cured, and then the exterior layer 34 was added to the base layer 30 surface opposite the first carrier film 32. A 4 mil thick second carrier film 42 made of polyester was then attached to the outer surface of the exterior layer 34, and then the first carrier film 32 was removed. The metallic layer 20 was then bonded to the base layer 30 on the surface exposed by removal of the first carrier film 32, and then the anti-corrosion layer was added. This protective film 14 blocked at least 99.99% of incident UV radiation between 250 nm and 400 nm, had a thermal emissivity of 0.55, and a solar absorptivity of 0.1. The protective film 14 is expected to provide good protection from AO and $O_3$.

Example 2—Protective Film of Soluble PI, Metal, Single Layer DE Bonded to UHMWPE Laminate A protective film 14 comprises a base layer 30 consisting of a 60 meter to polyimide film with a thickness of 2.5 microns fabricated from a soluble polyimide polymer made from 6FDA-BDAF, a metallic coating, and a dielectric coating. This protective film 14 is affixed to a flexible substrate 12 comprised of ultrahigh molecular weight polyethylene (UHMWPE) fibers, into which a binding polymeric adhesive has been imbibed to function as a binder matrix, by co-curing the protective film 14 onto the surface of the UHMWPE substrate 12 with the metallic coating contacting the substrate 12. The metallic layer 20 comprises 400 angstroms of aluminum, and the dielectric coating comprises 750 angstroms of $SiO_2$. The dielectric layer and the metallic layer 20 are directly bonded to opposite sides of the polyimide base layer 30. The base layer 30 is cast on a 3 mil thick first carrier film 32 made of polypropylene, then cured, and then the metallic layer 20 was bonded to the base layer 30 surface opposite the second carrier film 42. The metallic layer 20 is an interior layer 40, so the first carrier film 32 was connected to the exterior surface of the base layer 30. The base layer 30 was then removed from the second carrier film 42. The exterior layer 34 was then bonded to the base layer 30 on the surface exposed by removal of the second carrier film 42. The protective film 14 blocked at least 99.99% of incident UV radiation between 250 nm and 400 nm, had a solar absorptivity of 0.16, and a solar emissivity of 0.35. The protective film 14 is expected to provide good protection from AO and $O_3$.

Example 3—Protective Film of Soluble PI, Pigment, No Metal, Single Layer DE

A protective film 14 is comprised of a dielectric coating and a base layer 30. The base layer 30 is 12 microns thick, 130 meters long, and comprises a soluble polyimide polymer 6FDA-BDAF and a $TiO_2$ (titanium dioxide) pigment at a 1/1 pigment to polyimide binder ratio (by weight). This 130 m protective film 14 is directly bonded to a fibrous substrate 12. The dielectric coating comprises 1,000 angstroms of $SiO_2$ directly bonded to the base layer 30. The base layer 30 is cast on a 3 mil thick first carrier film 32 made of polypropylene bonded to a 3 mil thick polyester, then the base layer was cured, and then the exterior layer 34 of $SiO_2$ was added to the base layer 30 surface opposite the first carrier film 32. The first carrier film 32 was left on the protective film 14 until the protective film 14 was bonded to the substrate 12. The protective film 14 blocked at least 99.99% of incident UV radiation, had a solar absorptivity of 0.10, and a solar emissivity of 0.85. The protective film 14 is expected to provide good protection from AO and $O_3$.

Example 4—Protective Film of Soluble PI, Pigment, No Metal, and Multiple Layer DE A protective film 14 is comprised of a multiple layer dielectric coating and a base layer 30. The base layer 30 is 5 microns thick, 50 meters long, and comprises a soluble polyimide polymer 6FDA-BDAF and a $TiO_2$ (titanium dioxide) pigment at a 0.25/1 pigment to polyimide binder ratio (by weight). This protective film 14 is directly bonded to a fibrous substrate 12. The total dielectric coating comprises nine layers of low index and high index metal oxide layers directly bonded together with a total thickness of 5,258 angstroms, wherein each layer has a thickness variation of less than 3%, with the lowermost layer directly bonded to the base layer 30. The base layer 30 is cast on a carrier film, and the carrier film is removed prior to applying the dielectric coating. This is an example of a coating process where a carrier film was not used for strength, but the coating process was not a high throughput coating process. The protective film 14 blocked 99% of incident UV radiation, had a solar absorptivity of 0.10, and a solar emissivity of 0.65. The protective film 14 is expected to provide good protection from AO and $O_3$.

CONCLUSION

Although the current invention has been described for use with an airship 8, other uses are possible. Specific examples include protective blankets for use in outer space, and protective films for use with solar panels.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A process for making a protective film comprising:
   (a) providing a first carrier film;
   (b) coating the first carrier film with a dope comprising a polymer and a solvent;
   (c) curing the dope to form a base layer by evaporating the solvent where the base layer has an exterior surface and an interior surface, and wherein the interior surface of the base layer is in contact with the first carrier film;
   (d) coating the base layer exterior surface with an exterior surface coating, wherein the exterior surface coating comprises a metal or a metalloid; and
   (e) removing the first carrier film; wherein the protective film comprises the base layer with the exterior surface coating;
   (f) adding a second carrier film in contact with the coated exterior surface of the base layer;
   (g) coating the interior surface of the base layer with an interior surface coating comprising at least one of a fluorinated polymer, a dielectric material, metal, or a metalloid and (h) removing the second carrier film.

2. The process of claim 1 where a total of the base layer thickness and the exterior surface coating thickness is less than 14 microns.

3. The process of claim 1 further comprising adding a reflective pigment to at least one of the base layer and the exterior surface coating.

4. The process of claim 1 further comprising adding an electro-static discharge additive to at least one of the base layer and the exterior surface coating.

5. The process of claim 1 where the protective film forms at least one component of an airship.

6. The process of claim 1 where the protective film has a thermal emissivity greater than a solar absorptivity.

7. The process of claim 1 where the protective film blocks at least 90% of ultraviolet radiation.

* * * * *